United States Patent
Lee et al.

(10) Patent No.: US 9,692,868 B2
(45) Date of Patent: Jun. 27, 2017

(54) MOBILE TERMINAL AND CONTROL METHOD FOR THE MOBILE TERMINAL

(71) Applicant: LG ELECTRONICS INC., Seoul (KR)

(72) Inventors: Younkyung Lee, Seoul (KR); Seunghyun Lee, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/980,930

(22) Filed: Dec. 28, 2015

(65) Prior Publication Data

US 2017/0064062 A1    Mar. 2, 2017

(30) Foreign Application Priority Data

Sep. 1, 2015 (KR) .................... 10-2015-0123813

(51) Int. Cl.
*H04M 3/00*   (2006.01)
*H04M 1/725*   (2006.01)
*G07C 9/00*   (2006.01)
*H04W 4/02*   (2009.01)

(52) U.S. Cl.
CPC ...... *H04M 1/7253* (2013.01); *G07C 9/00079* (2013.01); *H04M 1/72572* (2013.01); *H04W 4/023* (2013.01)

(58) Field of Classification Search
CPC ............ G07C 9/00563; G07C 9/00079; Y02B 20/42; Y02B 20/46; H05B 37/0272; H05B 37/0218; H05B 37/0227; H05B 37/0281; G06F 3/01; G06F 3/0482; G06K 9/00; E05B 17/0083; E05B 47/0002; E05B 47/0012; E05B 2047/0058; Y10T 292/37; Y10T 70/7062; H04W 4/008; H04W 4/023; H04M 1/7253; H04M 1/72572
USPC .......................................... 455/420; 345/522
See application file for complete search history.

(56) References Cited

U.S. PATENT DOCUMENTS

| | | | |
|---|---|---|---|
| 8,520,072 B1 | 8/2013 | Slavin et al. | |
| 9,322,201 B1 * | 4/2016 | Cheng | .................... E05B 55/12 |
| 2001/0038690 A1 | 11/2001 | Palmer et al. | |
| 2006/0114099 A1 * | 6/2006 | Deng | ................. G07C 9/00563 340/5.53 |
| 2006/0204050 A1 * | 9/2006 | Takizawa | ........... G06K 9/00288 382/115 |
| 2009/0324020 A1 | 12/2009 | Hasebe et al. | |
| 2013/0057695 A1 | 3/2013 | Huisking | |
| 2013/0171967 A1 | 7/2013 | Ashour et al. | |

(Continued)

FOREIGN PATENT DOCUMENTS

JP    2003-188999 A    7/2003
JP    2003-219396 A    7/2003

(Continued)

*Primary Examiner* — Mahendra Patel
(74) *Attorney, Agent, or Firm* — Birch, Stewart, Kolasch & Birch, LLP

(57) ABSTRACT

A mobile terminal including a display: a wireless communication unit configured to pair the mobile terminal with a doorlock device; and a controller configured to receive an image captured by the doorlock device, display the received image on the display, and control the doorlock device based on a touch input applied to the displayed image.

17 Claims, 12 Drawing Sheets

(56) References Cited

U.S. PATENT DOCUMENTS

| | | | |
|---|---|---|---|
| 2013/0191755 A1* | 7/2013 | Balog | H04L 12/2807 |
| | | | 715/735 |
| 2014/0165160 A1* | 6/2014 | Bae | H04L 63/104 |
| | | | 726/4 |
| 2014/0203950 A1* | 7/2014 | Zdeblick | G06F 19/3418 |
| | | | 340/870.07 |
| 2014/0218517 A1* | 8/2014 | Kim | H04L 12/2818 |
| | | | 348/143 |
| 2014/0221049 A1 | 8/2014 | Kim et al. | |
| 2014/0267716 A1 | 9/2014 | Child et al. | |
| 2014/0306833 A1* | 10/2014 | Ricci | B60Q 1/00 |
| | | | 340/901 |
| 2015/0102610 A1* | 4/2015 | Johnson | G07C 9/00174 |
| | | | 292/144 |
| 2016/0055422 A1* | 2/2016 | Li | G05B 15/02 |
| | | | 706/12 |
| 2016/0143022 A1* | 5/2016 | Kim | H04W 72/048 |
| | | | 455/415 |
| 2017/0011570 A1* | 1/2017 | Johnson | G07C 9/00007 |

FOREIGN PATENT DOCUMENTS

| | | | | |
|---|---|---|---|---|
| KR | 100891010 B1 * | 3/2009 | | |
| KR | 20140077429 A * | 6/2014 | | H04L 12/12 |

\* cited by examiner

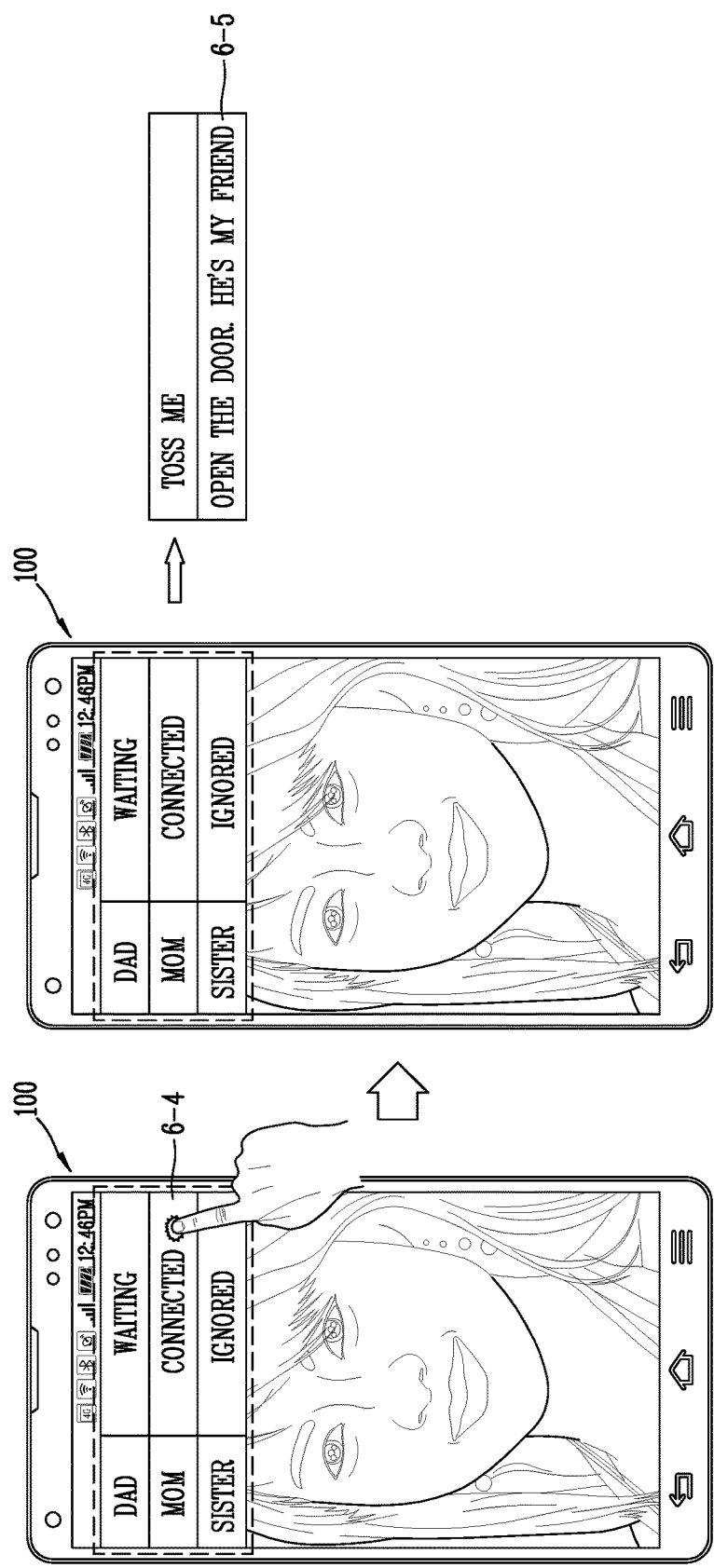

MOBILE TERMINAL AND CONTROL METHOD FOR THE MOBILE TERMINAL

CROSS-REFERENCE TO RELATED APPLICATIONS

This application claims the benefit of priority of Korean Patent Application No. 10-2015-0123813, filed on Sep. 1, 2015, which is herein expressly incorporated by reference in their entireties.

BACKGROUND OF THE INVENTION

1. Field of the Invention

The present disclosure relates to a mobile terminal, and a control method thereof.

2. Description of the Related Art

Terminals may be divided into mobile/portable terminals and stationary terminals. Also, the mobile terminals may be classified into handheld terminals and vehicle mount terminals according to whether or not a user can directly carry. As it becomes multifunctional, a mobile terminal can be allowed to capture still images or moving images, play music or video files, play games, receive broadcast and the like, so as to be implemented as an integrated multimedia player.

SUMMARY OF THE INVENTION

A mobile terminal according to an embodiment of the present disclosure receives an image captured by a doorlock device, displays the received image on a display unit, and controls the doorlock device based on a touch input applied to the displayed image.

To achieve these and other advantages and in accordance with the purpose of the present invention, as embodied and broadly described herein, the present invention provides in one aspect a mobile terminal including a display: a wireless communication unit configured to pair the mobile terminal with a doorlock device; and a controller configured to receive an image captured by the doorlock device, display the received image on the display, and control the doorlock device based on a touch input applied to the displayed image. The present invention also provides a corresponding method of controlling a mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A through 6C are views illustrating still another method of controlling a doorlock device based on a visitor image (image information) according to an embodiment of the present disclosure;

DETAILED DESCRIPTION OF THE INVENTION

Description will now be given in detail according to the embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the configuration according to the embodiments of this specification can also be applied to stationary terminals such as digital TV, desktop computers and the like, excluding a case of being applicable only to the mobile terminals.

Figure 1A:
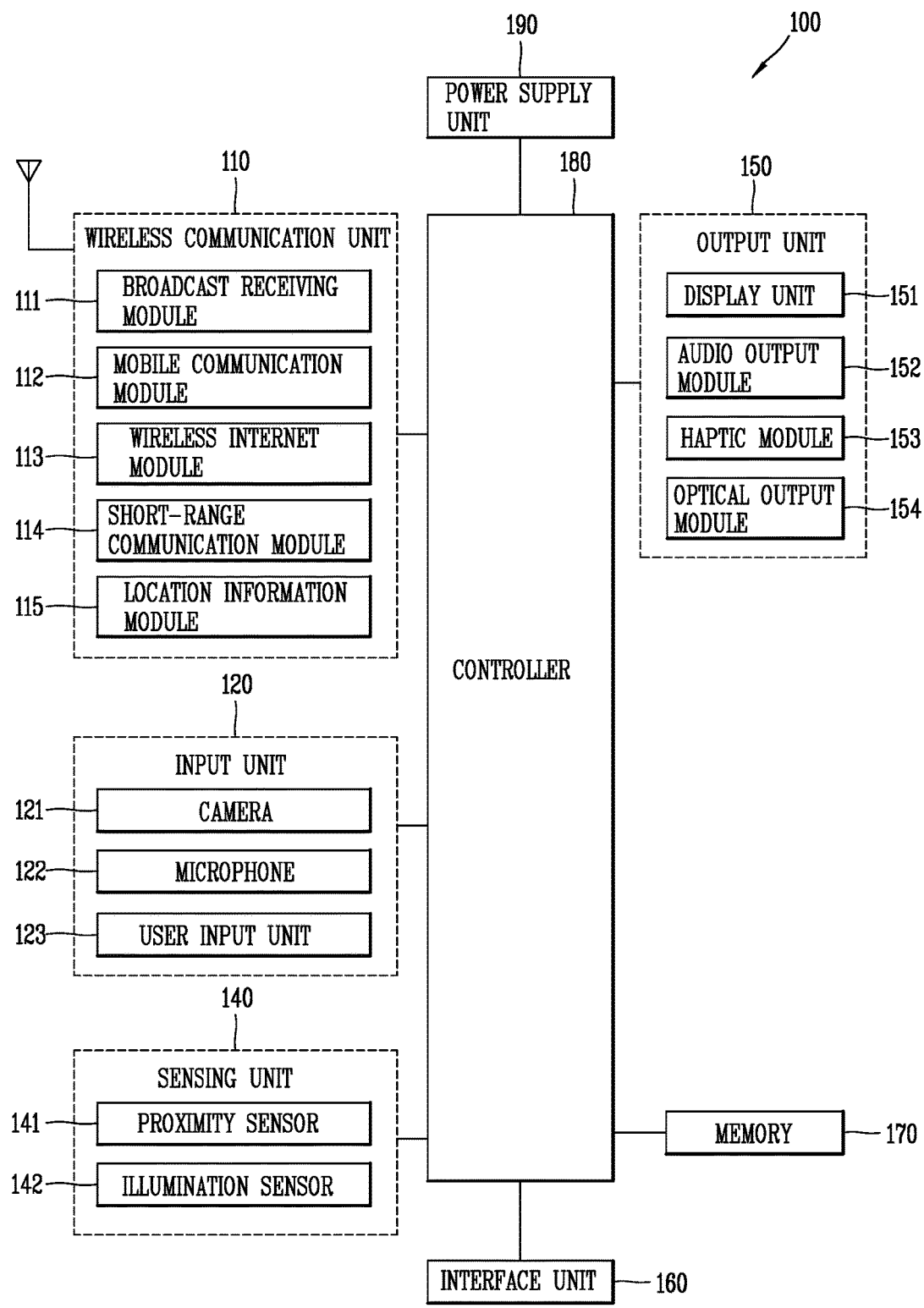
FIG. 1A is a block diagram illustrating a mobile terminal according to an embodiment of the present disclosure.
Figure 1B:
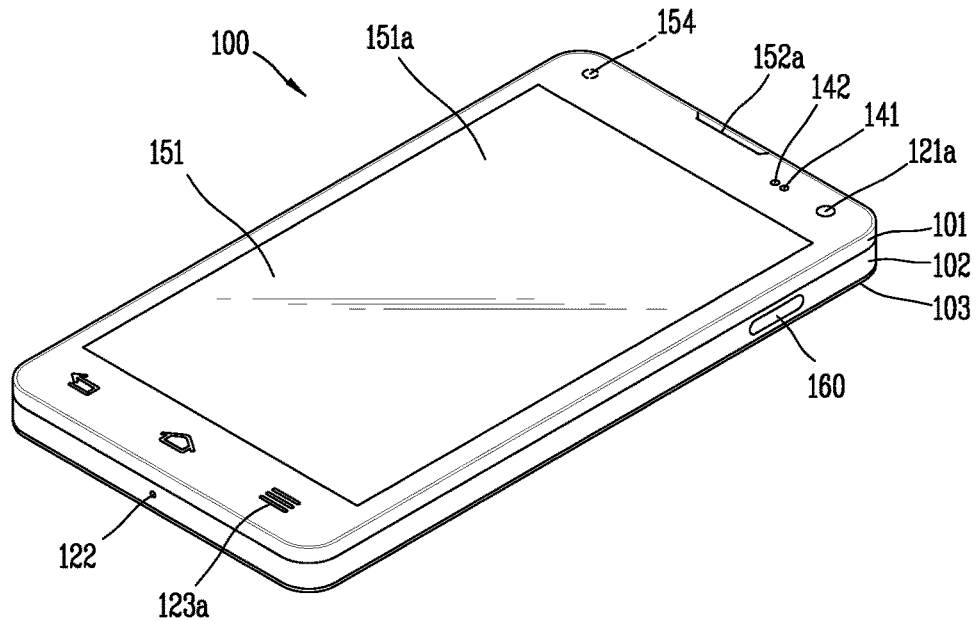
FIGS. 1B and 1C are conceptual views illustrating an example in which a mobile terminal according to an embodiment of the present disclosure is seen from different directions.
Figure 1C:
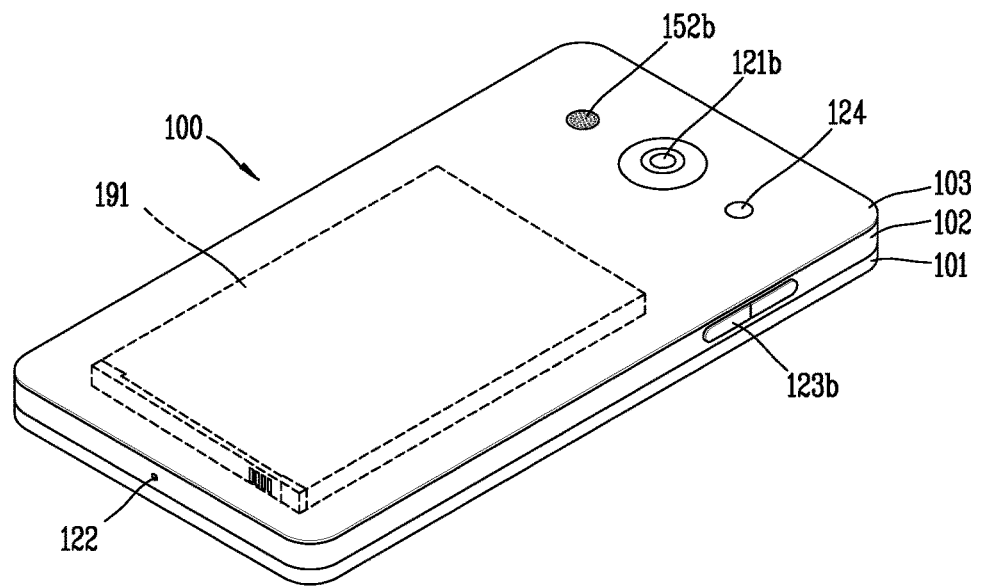

Referring to FIGS. 1A through 1C, FIG. 1A is a block diagram of a mobile terminal in accordance with the present disclosure, and FIGS. 1B and 1C are conceptual views of one example of the mobile terminal, viewed from different directions. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

The wireless signals may include audio call signal, video (telephony) call signal, or various formats of data according to transmission/reception of text/multimedia messages. The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, smart glasses or a head mounted display (HMD), which can exchange data with the mobile terminal 100 (or to like data with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, the proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving state, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a state of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description in association with a specific type of mobile terminal or on a specific type of mobile terminal will be also typically applied to another type of mobile terminal.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a. The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170. The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like. Furthermore, the first and second manipulation units 123a and 123b may employ a method of perform manipulation without the user's tactile feeling through a proximity touch, a hovering touch or the like.

The drawings are illustrated on the basis that the first manipulation unit 123a is a touch key, but the present disclosure is not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123. The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body. The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Further, in recent years, consumer lives have been digitized on the whole. For example, a digital doorlock device can control the opening and closing of a door based on information received through an input device provided with the digital doorlock device. As described above, in recent years, security information or personal information should be entered to a home appliance, an Internet site, and the. Accordingly, personal information or security information (for example, password) must be memorized by a user.

Accordingly, an aspect of the present disclosure is to provide a mobile terminal and a control method thereof capable of providing security information or personal information when required even if the user does not memorize them one by one. In addition, in the present disclosure, "security information" or "personal information" will be collectively referred to as "security set information."

Further, security set information may be information entered from a user or information transmitted from at least one external device or external server. For example a password may be entered to a terminal from a user, and the controller can perform security processing for the password information.

Here, performing "security processing" denotes switching general information to security set information not to allow the general information to be displayed without undergoing an authentication process for displaying it on the terminal. The authentication process is a process that should be necessarily undergone to display security set information, and when the authentication process is completed, namely, when authentication is successful, the security set information is displayed on the terminal. The authentication process may be performed through any one of various methods which will be described later.

Further, the process of selecting (or setting, processing 0 specific information as security set information may be performed in various ways, and there exist various modified examples for various graphic interfaces, respectively, provided by each terminal, and the present disclosure will be described on the assumption that security set information has been already existed.

Hereinafter, a mobile terminal and a control method thereof capable of easily and quickly controlling a door lock or doorlock device based on image information received from the doorlock device installed on a safe, a house door, or the like.

Figure 2:
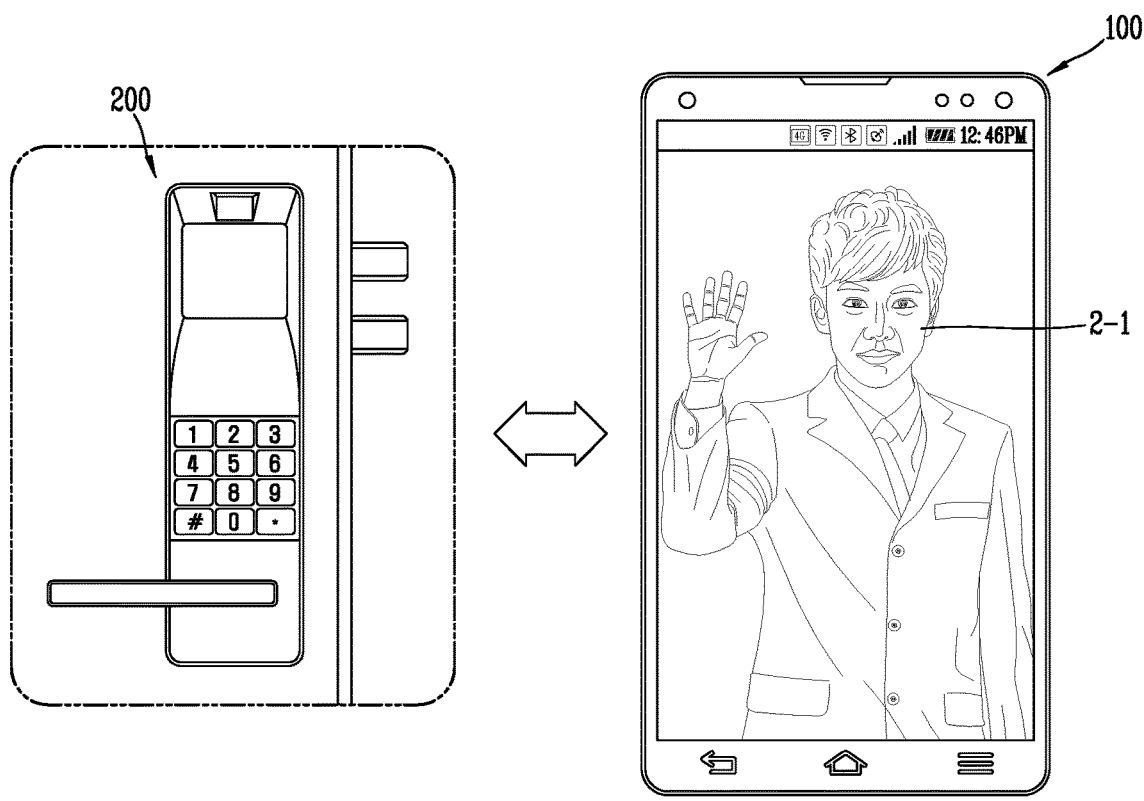
FIG. 2 is a view illustrating a mobile terminal connected to a doorlock device according to an embodiment of the present disclosure.

FIG. 2 is a view illustrating a mobile terminal connected to a doorlock device according to an embodiment of the present disclosure. As illustrated in FIG. 2, the mobile terminal 100 may be connected to the doorlock device 200 through a wireless communication network. For example, the mobile terminal 100 may be connected to the doorlock device 200 through at least one of WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced).

The mobile terminal 100 may be connected to the doorlock device 200 through at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct, and Wireless USB (Wireless Universal Serial Bus). Further, the mobile terminal 100 can receive image information (for example, visitor information) 2-1 captured by a camera of the doorlock device 200 in real time, and display the received image information 2-1 on the display unit 151.

Figure 3:
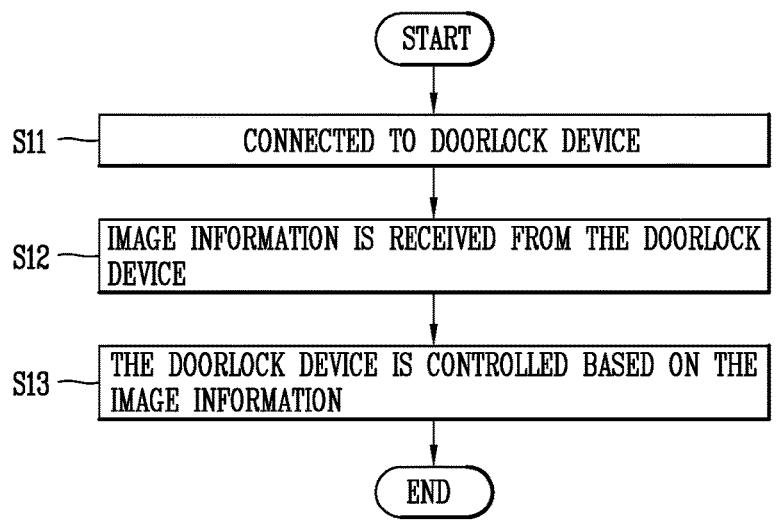
FIG. 3 is a flow chart illustrating a control method of a mobile terminal according to an embodiment of the present disclosure.

FIG. 3 is a flow chart illustrating a control method of a mobile terminal according to an embodiment of the present disclosure. First, the controller 180 is connected to (paired with) the doorlock device 200 through the wireless communication unit 110 according to a user request or automatically (S11). For example, the controller 180 is connected to the doorlock device 200 through the wireless communication unit 110 according to a user request. The controller 180 can be connected to the doorlock device 200 through the wireless communication unit 110 when the wireless communication unit 110 approaches the doorlock device 200.

The controller 180 can connect to the doorlock device 200 when an access request is received from the doorlock device 200 through the wireless communication unit 110. For example, when a visitor pays a visit, the doorlock device 200 can capture a visitor image (image information) through a camera of the doorlock device 200, and transmit the visitor image (image information) to the mobile terminal 100. In addition, when a visitor pays a visit, the doorlock device 200 can capture a visitor image (image information) through a camera of the doorlock device 200, and request an access to the mobile terminal 100, and access the mobile terminal 100 to transmit the visitor image (image information) to the mobile terminal 100 when access permission information is received from the mobile terminal 100 in response to the access request.

The controller 180 receives the visitor image (image information) from the doorlock device 200 through the wireless communication unit 110 (S12). The controller 180 controls the doorlock device 200 based on the visitor image (image information) (S13). For example, the controller 180 receives image information (for example, visitor image) captured by the camera of the doorlock device 200 in real time, and displays the received image information on the display unit 151. The controller 180 controls the doorlock device 200 (for example, performs the operation of unlocking or locking the 200) based on a touch input applied to the image information (for example, visitor image) displayed on the display unit 151.

Figure 4A:
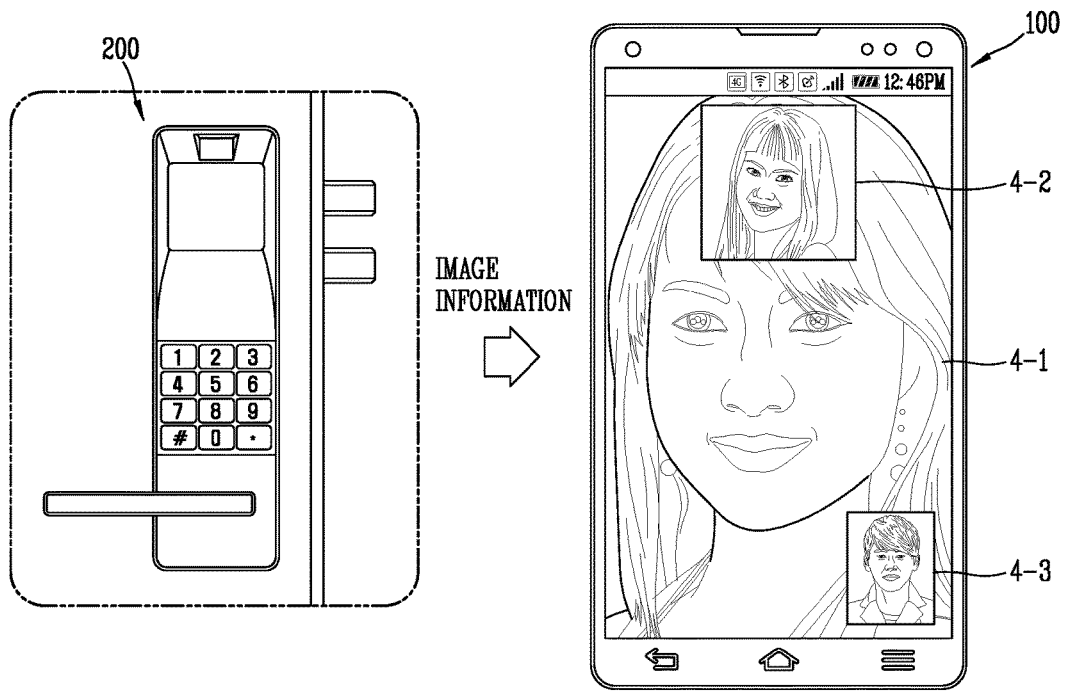
FIGS. 4A and 4B are views illustrating a method of controlling a doorlock device based on a visitor image (image information) according to an embodiment of the present disclosure.
Figure 4B:
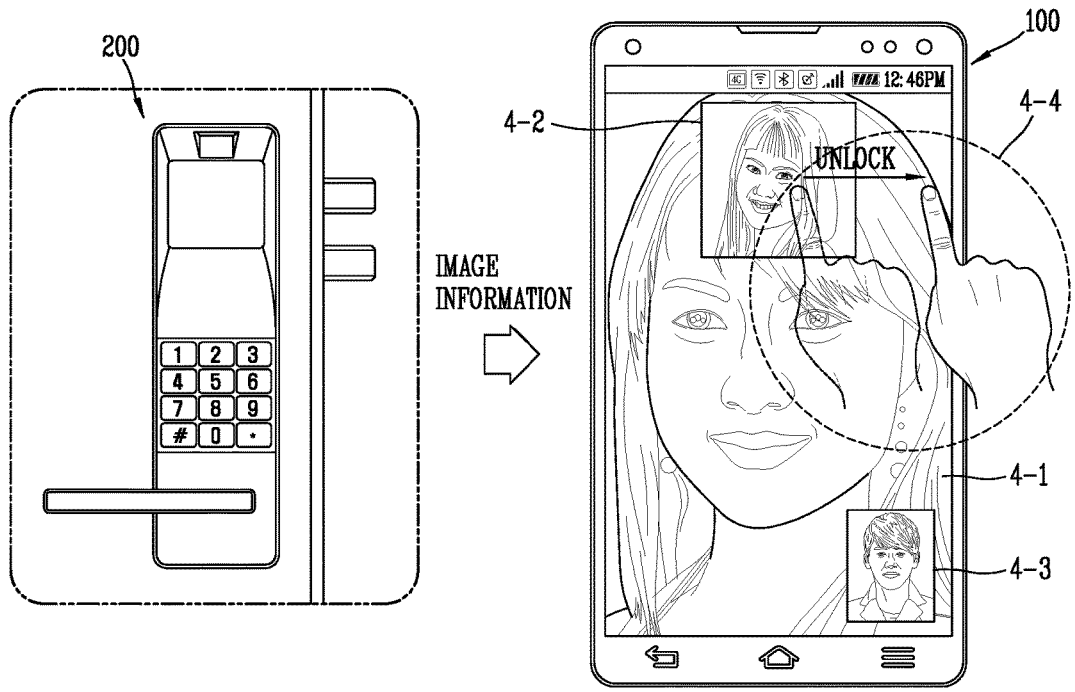

Hereinafter, a method of controlling the doorlock device 200 based on the visitor image (image information) will be described with reference to FIGS. 4A and 4B. In particular, FIGS. 4A and 4B are views illustrating a method of controlling the doorlock device 200 based on a visitor image (image information) according to an embodiment of the present disclosure. As illustrated in FIG. 4A, the controller 180 can display a content (for example, Internet webpage, photo, music information, video, etc.) 4-1 on the display unit 151, and when the visitor image (image information) 4-2 captured by the doorlock device 200 is received from the doorlock device 200 while displaying the content 4-1 on the display unit 151, the controller 180 can display the received visitor image (image information) 4-2 in a partial region of the content 4-1, thereby allowing the user to check the visitor image 4-2 in real time while viewing the content 4-1.

When the visitor image (image information) 4-2 is received from the doorlock device 200 while displaying the content 4-1 on the display unit 151, the controller 180 can capture a user image 4-3 through the camera 121, and display the user image 4-3 in a partial region of the content 4-1. For example, when the visitor image (image information) 4-2 is received from the doorlock device 200 while displaying the content 4-1 on the display unit 151, the controller 180 can display the visitor image (image information) 4-2 in a first region of the content 4-1, and display the user image 4-3 in a second region of the content 4-1.

As illustrated in FIG. 4B, the controller 180 can unlock or lock the doorlock device based on a touch input (or gesture, voice command, etc.) 4-4 applied to the visitor image (image information) 4-2 displayed on the display unit 151. For example, when the touch input 4-4 applied to the visitor image (image information) 4-2 displayed on the display unit 151 is a touch input for unlocking the doorlock device, the controller 180 can unlock the doorlock device. When the touch input 4-4 applied to the visitor image (image information) 4-2 displayed on the display unit 151 is a touch input for locking the doorlock device, the controller 180 can lock the doorlock device.

When the touch input 4-4 applied to the visitor image (image information) 4-2 displayed on the display unit 151 is a touch input for ignoring the visitor image (image information) 4-2, the controller 180 deletes the visitor image (image information) 4-2.

Hereinafter, another method of controlling the doorlock device 200 based on the visitor image (image information) will be described with reference to FIGS. 5A through 5C. In particular, FIGS. 5A through 5C are views illustrating another method of controlling the doorlock device 200 based on a visitor image (image information) according to an embodiment of the present disclosure.

Figure 5A:
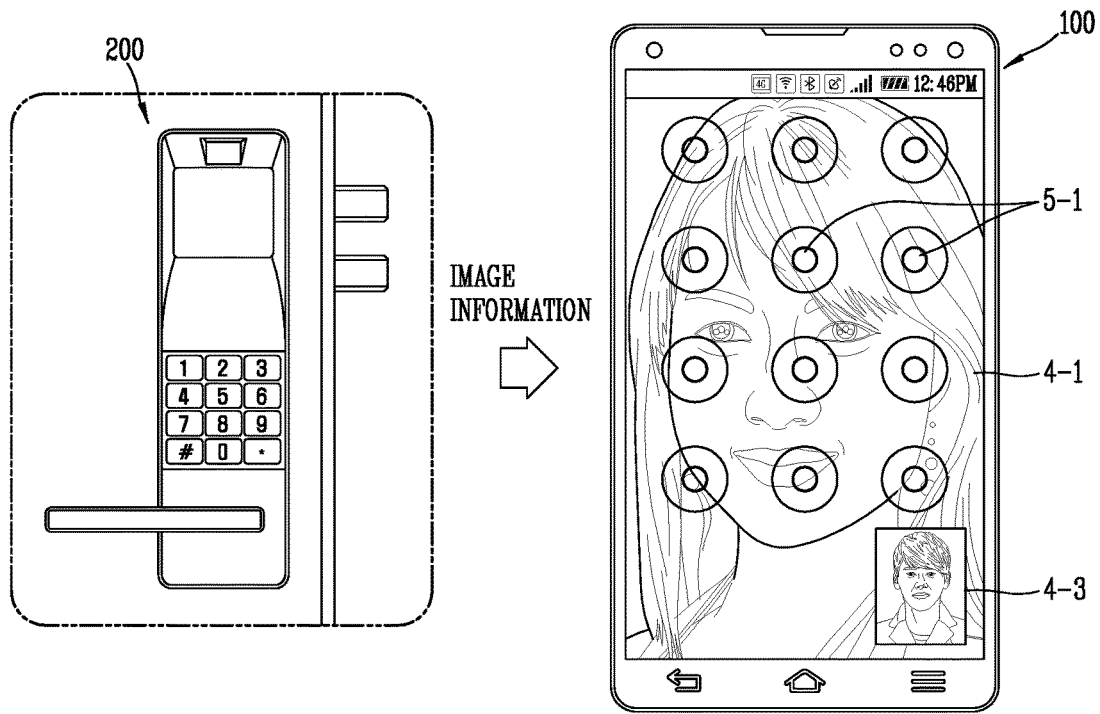
FIGS. 5A through 5C are views illustrating another method of controlling a doorlock device based on a visitor image (image information) according to an embodiment of the present disclosure.

As illustrated in FIG. 5A, when the visitor image (image information) is received from the doorlock device 200 while displaying a content (Internet webpage, photo, music information, on a video call, etc.) 4-1 on the display unit 151, the controller 180 displays a touch pattern 5-1 for user authentication on the content 4-1. The user authentication method may be at least one of a fingerprint recognition process, a face recognition process, a voice recognition process and a password recognition process and a touch pattern recognition process or a combination thereof.

Figure 5B:
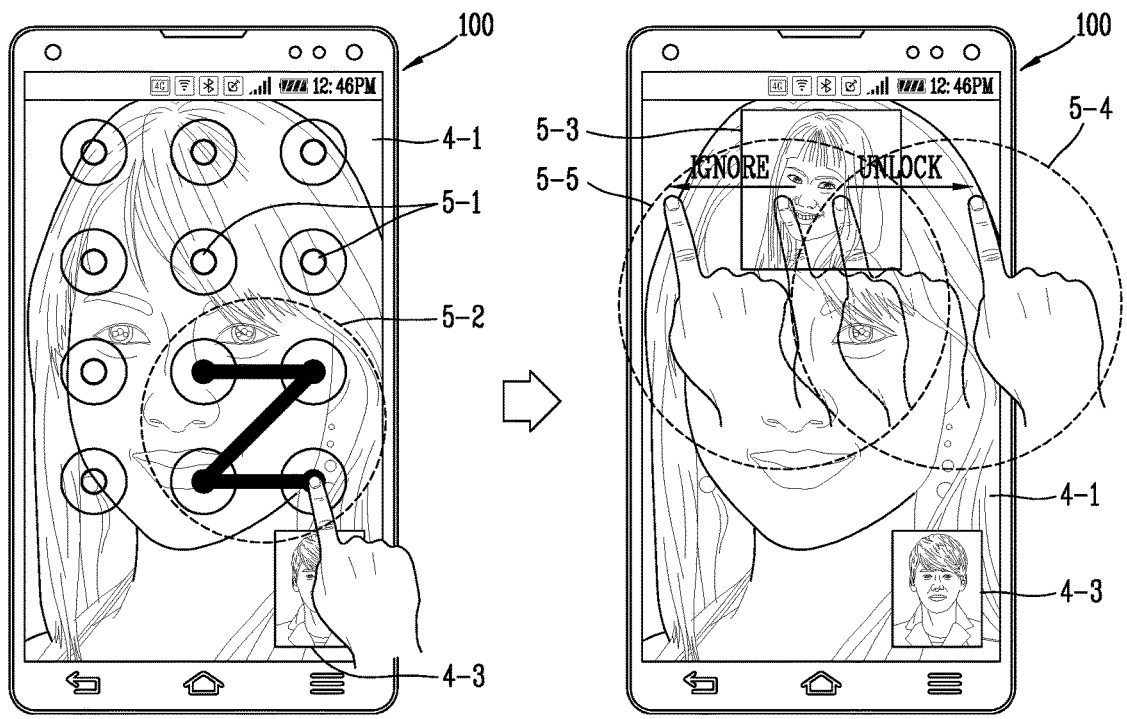
Figure 5C:
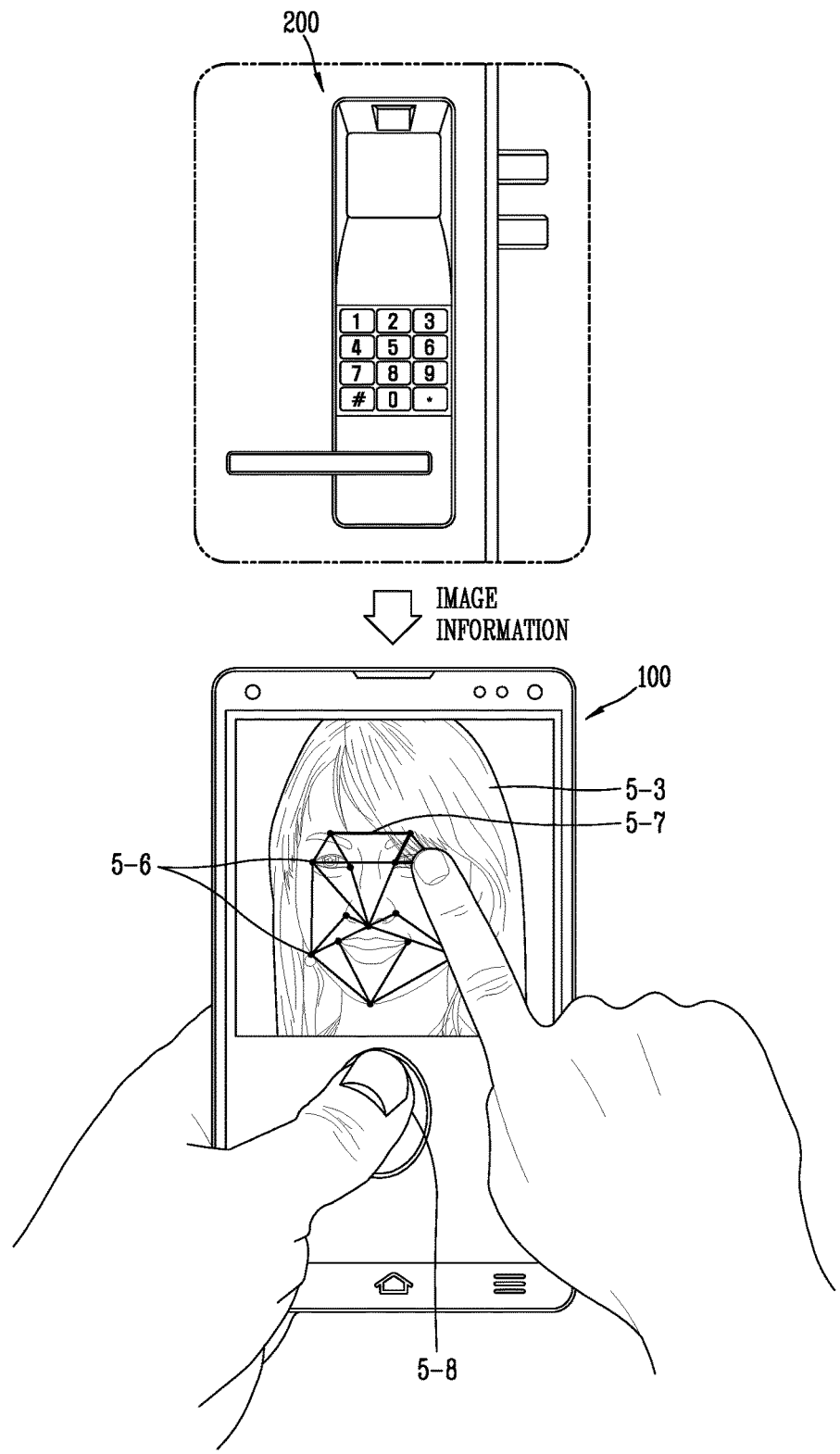

As illustrated in FIG. 5B, when a user authentication pattern 5-2 is received through a touch pattern 5-1 for the user authentication, the controller 180 authenticates a user, and displays the visitor image (image information) 5-3 in a first region of the content 4-1, and displays the user image 4-3 in a second region of the content 4-1. When a touch input 5-4 for unlocking the doorlock device is applied to the visitor image (image information) 5-3 displayed on the display unit 151, the controller 180 generates an unlock signal for unlocking the doorlock device, and transmits the unlock signal to the doorlock device 200 through the wireless communication unit 110 to unlock the doorlock device 200.

When a touch input 5-5 for ignoring the visitor image (image information) 5-3 displayed on the display unit 151 is applied to the visitor image (image information) 5-3, the controller 180 deletes the displayed visitor image (image information) 5-3 and user image 4-3, and displays only the content 4-1 on the display unit 151.

When the visitor image (image information) captured by the doorlock device 200 is received from the doorlock device 200 while displaying a video call screen on the display unit 151, the controller 180 can display the received visitor image (image information) on a partial region of the video call screen, thereby allowing the user to check a visitor image in real time while viewing the video call screen.

The controller 180 can display the received visitor image (image information) in a semi-transparent manner or divide the screen of the display unit 151 in a plural number, and display the visitor image (image information) and the content on the plurality of divided screens. Further, the controller 180 can display the received visitor image (image information) and the content in an overlaid manner on the display unit 151. When the visitor image (image information) captured by the doorlock device 200 is received from the doorlock device 200 while displaying a video call screen on the display unit 151, the controller 180 automatically mutes a video call voice, and transmits a user voice to the doorlock device 200 through the wireless communication unit 110.

When the visitor image (image information) captured by the doorlock device 200 is received from the doorlock device 200 while displaying a video call screen on the display unit 151, the controller 180 automatically mutes a video call voice, and transmits a user voice to the doorlock device 200 through the wireless communication unit 110, and receives a visitor voice from the doorlock device 200.

As illustrated in FIG. 5C, the controller 180 can extract facial features (for example, eyes, nose, mouth, eyebrows, etc.) from the visitor image (image information) 5-3, and display the extracted facial features as a touch pattern 5-6 for the user authentication, and authenticate a user when a user authentication pattern 5-7 is received.

The controller 180 can extract facial features (for example, eyes, nose, mouth, eyebrows, etc.) from the visitor image (image information) 5-3, and displays the extracted facial features as a touch pattern 5-6 for the user authentication, and authenticate a user when a user authentication fingerprint 5-8 is received while at the same time receiving a user authentication pattern 5-7.

Hereinafter, still another method of controlling the doorlock device 200 based on the visitor image (image information) will be described with reference to FIGS. 6A through 6C. In particular, FIGS. 6A through 6C are views illustrating still another method of controlling the doorlock device 200 based on a visitor image (image information) according to an embodiment of the present disclosure.

Figure 6A:
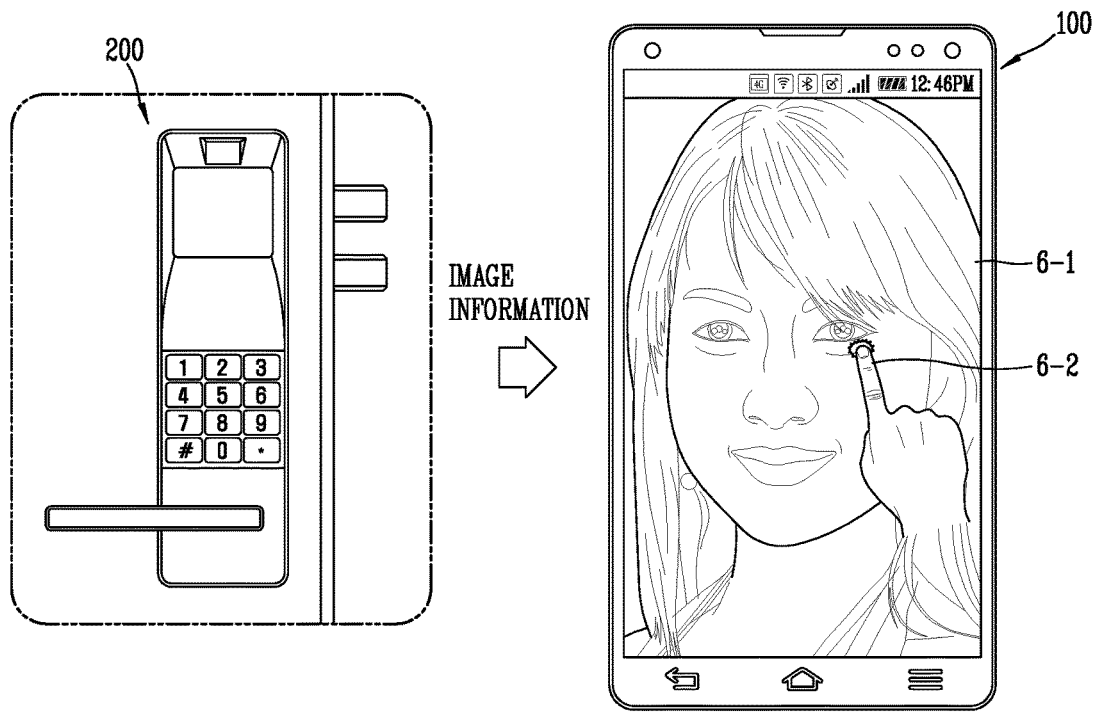

As illustrated in FIG. 6A, the controller 180 displays a content (for example, Internet webpage, photo, music information, video, etc.) on the display unit 151, and when the visitor image (image information) 6-1 captured by the doorlock device 200 is received from the doorlock device 200 while displaying the content on the display unit 151, the controller 180 displays the received visitor image (image information) 6-1 on the display unit 151. The doorlock device 200 transmits the visitor image (image information) 6-1 to a plurality of predetermined mobile terminals (for example, mobile terminals for a family).

When a user input (for example, a touch input, a gesture input, a voice command, etc.) 6-2 for requesting processing status information (for example, family's response situation for a visitor) on a visitor image (image information) 6-1 displayed on the display unit 151 is received, the controller 180 displays status information for which the visitor image (image information) 6-1 is processed by the plurality of predetermined mobile terminals on the visitor image (image information) 6-1.

Figure 6B:
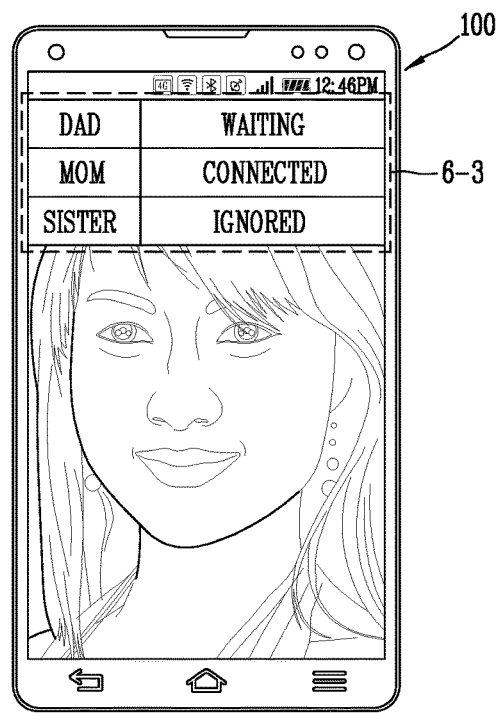

As illustrated in FIG. 6B, when a user input (for example, a touch input, a gesture input, a voice command, etc.) 6-2 for requesting processing status information on a visitor image (image information) 6-1 displayed on the display unit 151 is received, the controller 180 displays status information 6-3 for which the visitor image (image information) 6-1 is processed by the plurality of predetermined mobile terminals on the visitor image (image information) 6-1.

The processing status information 6-3 is information indicating a result in which each user of a plurality of mobile terminals processes the visitor image (image information) 6-1. For example, the controller 180 receives a first processing result (for example, waiting) of a first mobile terminal (for example, father's mobile terminal) on the visitor image (image information) 6-1 from the first mobile terminal (for example, dad's mobile terminal.)

The controller 180 receives a second processing result (for example, connected) of a second mobile terminal (for example, mother's mobile terminal) on the visitor image (image information) 6-1 from the second mobile terminal (for example, mom's mobile terminal.) The controller 180 receives a third processing result (for example, ignored) of a third mobile terminal (for example, sister's mobile terminal) on the visitor image (image information) 6-1 from the third mobile terminal (for example, sister's mobile terminal). The controller 180 displays the first through the third processing result on the visitor image (image information) 6-1 as the processing status information 6-3.

As illustrated in FIG. 6C, when the second processing result (for example, connected) 6-4 is selected from the processing status information 6-3, the controller 180 displays a message (for example, "Open the door. He's my friend") 6-5 written by the second mobile terminal on the visitor image (image information) 6-1 according to the second processing result (for example, connected) 6-4.

When any one or more processing results are selected from the processing status information 6-3, the controller 180 can display a message input window, and transmits a message entered on the message input window to mobile terminals corresponding to the any one or more processing results. When a touch input applied to the visitor image (image information) 6-1 displayed on the display unit 151 is a touch input for unlocking the doorlock device, the controller 180 unlocks the doorlock device, and when a touch input applied to the visitor image (image information) 6-1 displayed on the display unit 151 is a touch input for ignoring the visitor image (image information) 6-1, the controller 180 deletes the visitor image (image information) 6-1.

Hereinafter, a method of changing a content (for example, visitor image, visitor location information, visitor's estimated time of arrival, etc.) associated with a visitor according to a distance between the visitor's current location and the doorlock device 200 will be described with reference to FIGS. 7A and 7B. In particular, FIGS. 7A and 7B are views illustrating a method of changing a content (for example, visitor image, visitor location information, visitor's estimated time of arrival, etc.) associated with a visitor according to a distance between the visitor's current location and the doorlock device 200 according to an embodiment of the present disclosure.

Figure 7A:
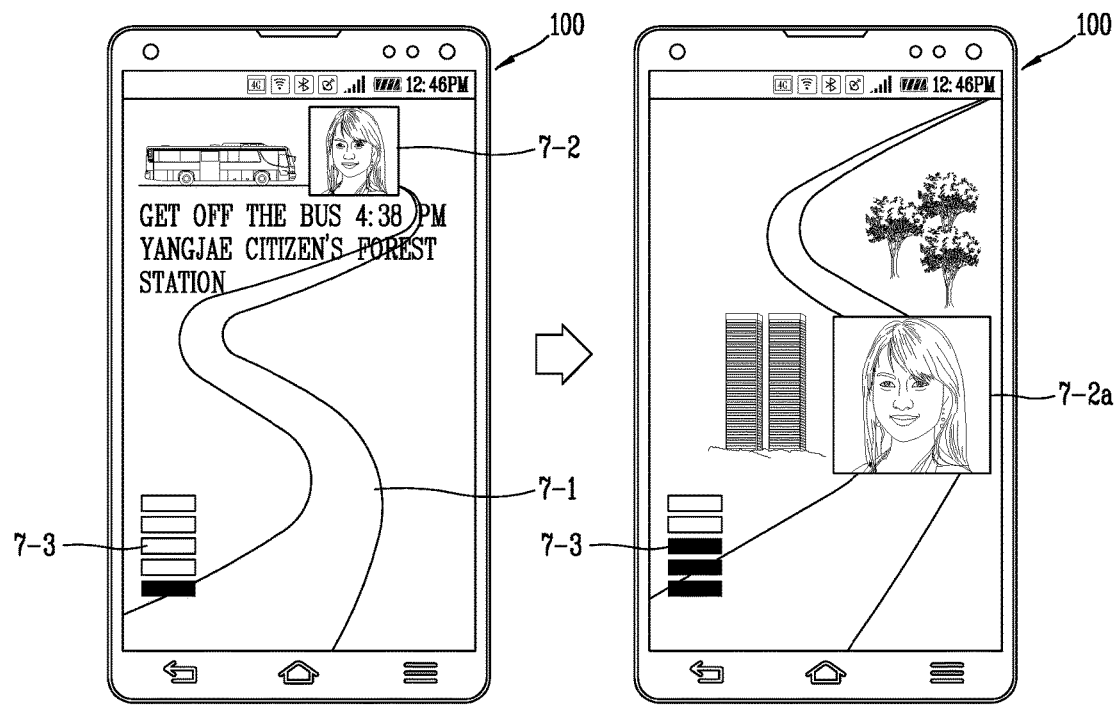
FIGS. 7A and 7B are views illustrating a method of changing a content associated with a visitor according to a distance between the visitor's current location and the doorlock device according to an embodiment of the present disclosure.
Figure 7B:
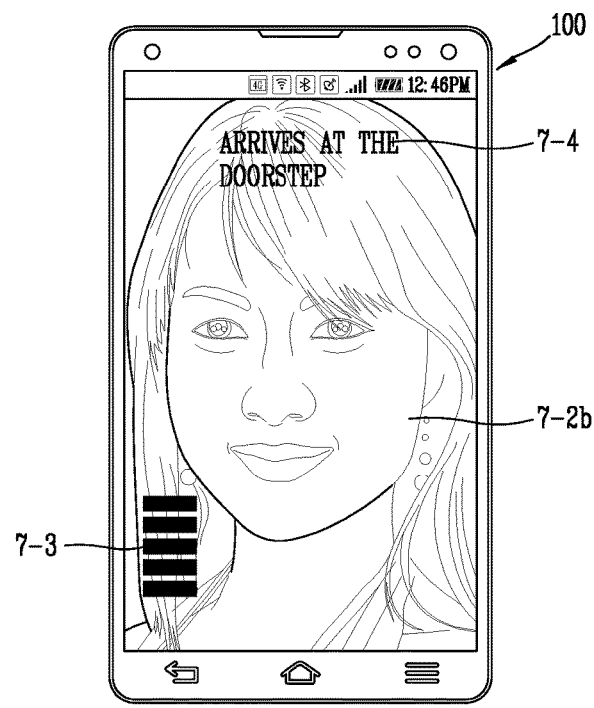

As illustrated in FIG. 7A, the controller 180 displays map data 7-1 on the display unit 151, and displays the visitor's current location information on the map data 7-1. The visitor's current location information may include a visitor image 7-2 corresponding to the visitor's current location. The controller 180 can display a graph 7-3 changed according to a distance between the visitor's current location and the doorlock device 200 on the map data 7-1.

The controller 180 can also display a visitor image 7-2 having a different size on the display unit 151 according to a distance between the visitor's current location. For example, the controller 180 displays a visitor image 7-2 with a first size on the display unit 151 when a distance between the visitor's current location and the doorlock device 200 is a first distance, and displays a visitor image 7-2*a* with a second size larger than the first size on the display unit 151 when a distance between the visitor's current location and the doorlock device 200 is a second distance smaller than the first distance.

The controller 180 can notify a user by at least any one of an icon, a vibration and a ringtone. When the visitor's current location information is selected by a user, the controller 180 can perform a call connection (or video call) to the visitor's mobile terminal or transmit a message (for example, a message currently written by the user, a predetermined message, etc.) to the visitor's mobile terminal.

As illustrated in FIG. 7B, when the visitor's current location is a location of the doorlock device 200, the controller 180 displays the visitor image 7-2*b* on the entire display region of the display unit 151, and displays notification information 7-4 indicating that the visitor's current location is located at the doorlock device 200 on the visitor image 7-2*b*.

In other words, the controller 180 changes a size of the visitor image according to a distance between the visitor's current location and a destination (for example, a location of the doorlock device 200). For example, the controller 180 increases a size of the visitor image according to a distance between the visitor's current location corresponding to the visitor image and the doorlock device 200 decreases.

The controller 180 changes a vibration intensity of the mobile terminal 100 and a volume level of an audio signal output through the mobile terminal 100 according to a distance between the visitor's current location and a destination (for example, a location of the doorlock device 200). For example, the controller 180 can increase a vibration intensity of the mobile terminal 100, and increases a volume level of an audio signal output through the mobile terminal 100 as a distance between the visitor's current location corresponding to the visitor image and the doorlock device 200 decreases. This effect can be shown by the graph 7-3 (e.g., an increase in volume or vibration).

Hereinafter, a method of registering a visitor captured by the doorlock device 200 will be described with reference to FIGS. 8A through 8D. FIGS. 8A through 8D are views illustrating a method of registering a visitor captured by the doorlock device 200 on a mobile terminal according to an embodiment of the present disclosure.

Figure 8A:
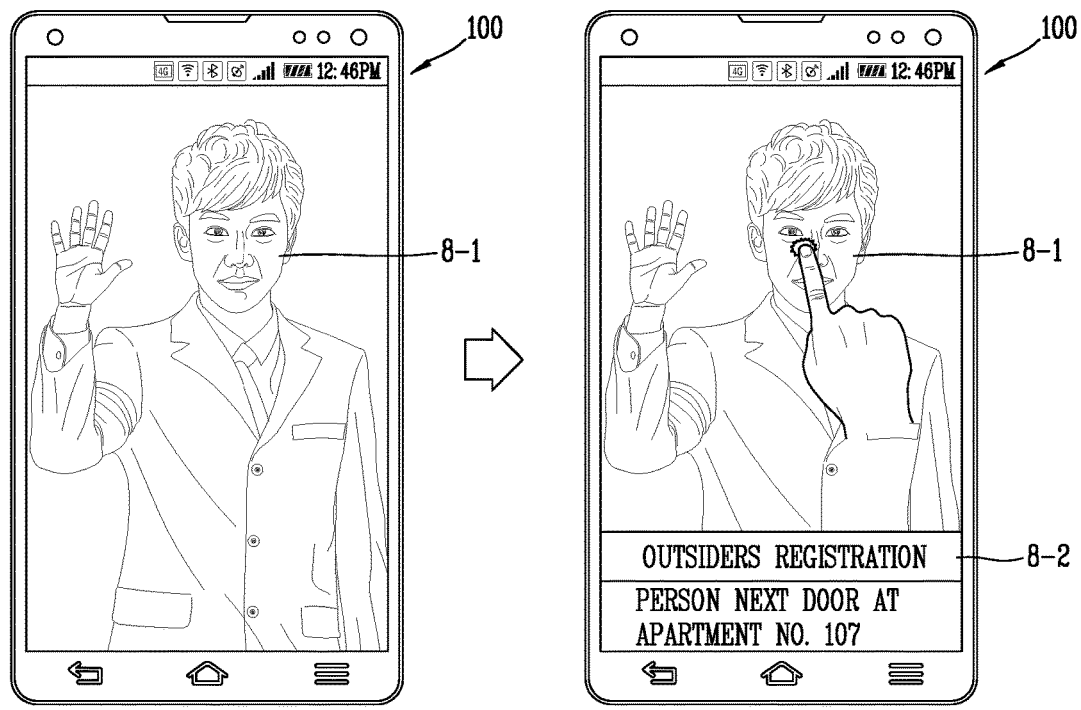
FIGS. 8A through 8D are views illustrating a method of registering a visitor captured by the doorlock device on a mobile terminal according to an embodiment of the present disclosure.

As illustrated in FIG. 8A, the controller 180 records a visitor image captured by the doorlock device 200 based on a user request or automatically, and displays an input window 8-2 for visitor registration on the visitor image (or captured visitor image) 8-1 when a touch input (or a menu, a user input, a gesture, etc.) for registering the recorded visitor image (or captured visitor image) 8-1 is received, and then when a user enters visitor information (for example, a person next door) on the input window 8-2, the controller 180 registers the entered visitor information along with the visitor image on a visitor list.

Figure 8B:
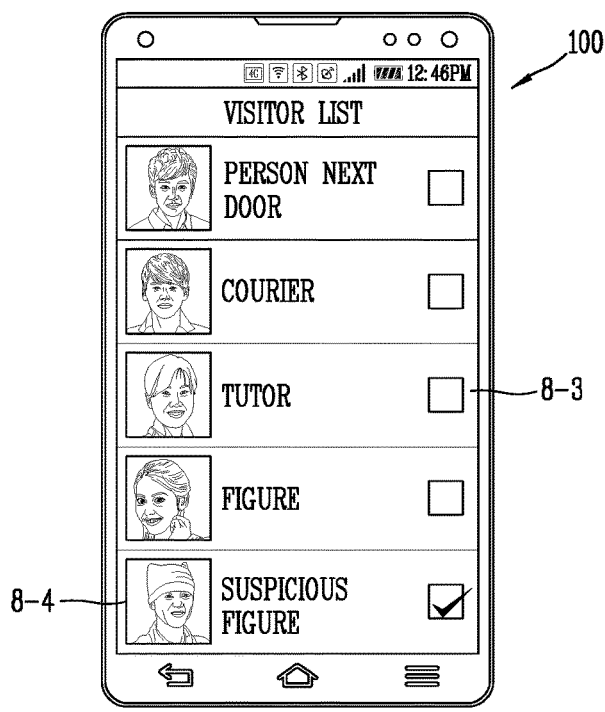

When a visitor video captured by the doorlock device 200 is received in real time, the controller 180 can automatically capture the received visitor video to acquire a still image, and automatically store the acquired still image in the memory 170. As illustrated in FIG. 8B, when a user input for requesting the visitor list 8-3 is received, the controller 180 displays the visitor list 8-3 on the display unit 151. The visitor list 8-3 may include visitor information and visitor images registered by the plurality of predetermined mobile terminals (for example, mobile terminals for a family.)

The controller 180 can automatically register a visitor image 8-4 that is not registered among the recorded visitor's images (or captured visitor images) as a suspicious figure (suspicious image, warning image) on the visitor list 8-3. The controller 180 can display the visitor image (suspicious image, warning image) 8-4 in a highlighted manner (for example, blinking manner, predetermined color, etc.)

Figure 8C:
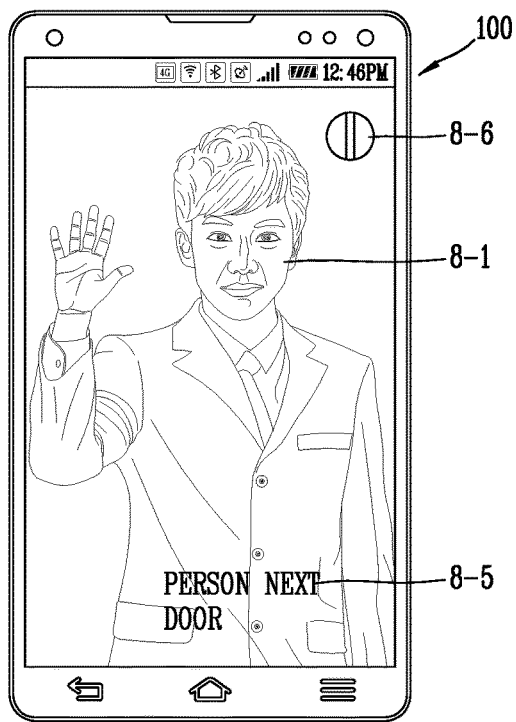

As illustrated in FIG. 8C, when the visitor image is received from the doorlock device 200, the controller 180 displays the received visitor image on the display unit 151, and compares the displayed visitor image with visitor images registered on the visitor list 8-3, and displays first visitor information (for example, a person next door, etc.) 805 mapped to a first visitor image on the displayed visitor image when the first visitor image among the visitor images registered on the visitor list 8-3 matches the displayed visitor image.

When the first visitor image among visitor images registered on the visitor list 8-3 matches the displayed visitor image, the controller 180 displays an icon 8-6 for controlling the doorlock device 200 on the visitor image. When the icon 8-6 is selected (touched) by a user, the controller 180 unlock or locks the doorlock device 200.

Figure 8D:
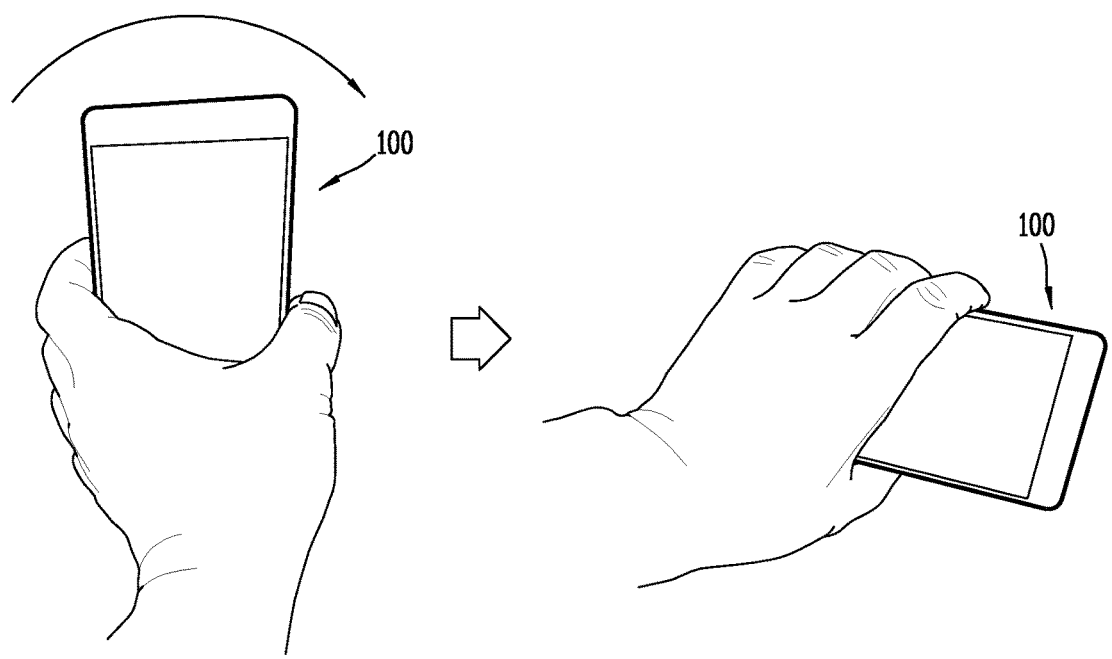

As illustrated in FIG. 8D, when the first visitor image among visitor images registered on the visitor list 8-3 matches the displayed visitor image, and then the rotation of the mobile terminal 100 (for example, a 90 degrees rotation of the mobile terminal) for controlling the doorlock device 200, a user gesture or the like is detected, the controller 180 unlocks or locks the doorlock device 200.

When the suspicious figure (suspicious image, warning image) 8-4 among visitor images registered on the visitor list 8-3 matches the displayed visitor image, the controller 180 forcibly locks the doorlock device 200 while at the same time outputting a warning sound through the audio output unit 152.

Hereinafter, a method of controlling the doorlock device 200 based on augmented reality information. In particular, FIG. 9 is a view illustrating a method of controlling the doorlock device 200 based on augmented reality information according to an embodiment of the present disclosure.

Figure 9:
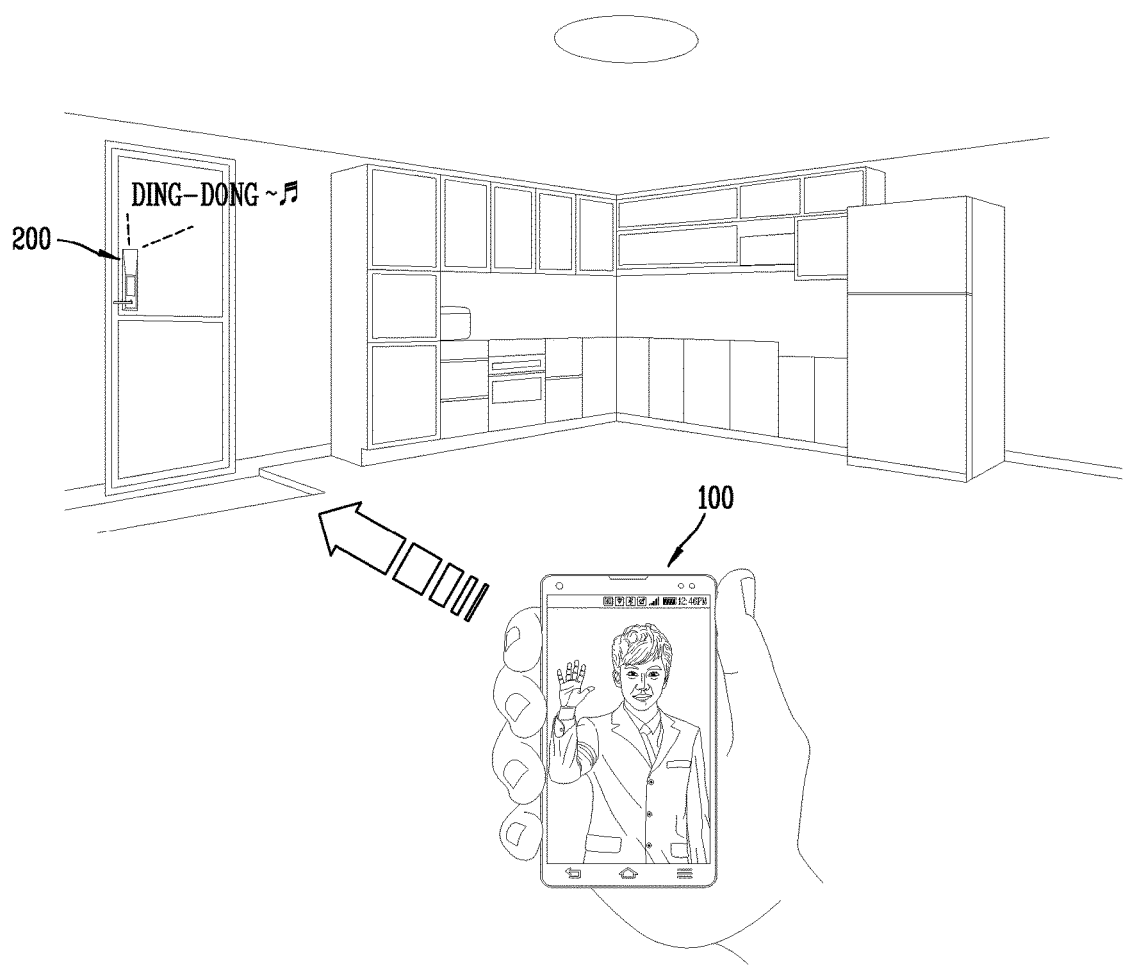
FIG. 9 is a view illustrating a method of controlling the doorlock device based on augmented reality information according to an embodiment of the present disclosure.

As illustrated in FIG. 9, when the doorlock device 200 is recognized through the camera 121 or a direction of the mobile terminal 100 (for example, a rear direction of the mobile terminal) is directed toward the doorlock device 200, the controller 180 automatically requests a visitor image to the doorlock device 200. For example, when a user listens to a doorbell sound, and a direction of the mobile terminal 100 (for example, a rear direction of the mobile terminal) is directed toward the doorlock device 200, the controller 180 is connected to (paired with) the doorlock device 200 through the wireless communication unit 110 to automatically request a visitor image to the doorlock device 200. The doorlock device 200 transmits a visitor image captured by the camera to the controller 180 through the wireless communication unit 110.

When the visitor image is received from the doorlock device 200, the controller 180 displays the received visitor image on the display unit 151, and displays an icon for controlling the doorlock device 200 on the display unit 151. When the icon is selected (touched) by a user, the controller 180 unlocks or locks the doorlock device 200.

As described above, a mobile terminal according to an embodiment of the present disclosure and a control method thereof can easily and quickly control a doorlock device based on the image information of the doorlock device.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a display;
a wireless communication processor configured to pair the mobile terminal with a doorlock device; and
a controller configured to:
receive an image captured by the doorlock device,
display the received image on the display, and
control the doorlock device based on a touch input applied to the displayed image,
wherein when the image is received from the doorlock device while a video call screen is displayed on the display, the controller is further configured to automatically mute a video call voice, and transmit a user voice corresponding to a user of the mobile terminal to the doorlock device through the wireless communication unit, and
wherein the controller is further configured to unlock or lock the doorlock device based on the touch input applied to the displayed image.

2. The mobile terminal of claim 1, wherein when the image is received from the doorlock device while displaying content on the display, the controller is further configured to display the image in a first partial region of the content.

3. The mobile terminal of claim 2, wherein when the image is received from the doorlock device while content is displayed on the display, the controller is further configured to capture a user image through a camera of the mobile terminal, and display the captured user image in a second partial region of the content.

4. The mobile terminal of claim 1, wherein the controller is further configured to:
perform a user authentication process for controlling the doorlock device when the image captured by the doorlock device is received, and
display the image on the display when an authentication process is completed based on user authentication information.

5. The mobile terminal of claim 4, wherein the authentication process is at least one of a fingerprint recognition process, a face recognition process, a voice recognition process and a password recognition process and a touch pattern recognition process or a combination thereof.

6. The mobile terminal of claim 1, wherein when the image is received from the doorlock device while the video call screen is displayed on the display, the controller is further configured to receive a visitor voice corresponding to the received image from the doorlock device through the wireless communication unit.

7. The mobile terminal of claim 1, wherein the controller is further configured to:
receive a user input for requesting processing status information of another mobile terminal for the image displayed on the display,
receive the processing status information of the image by the another mobile terminal from the another mobile terminal, and
display the received processing status information on the display of the mobile terminal.

8. The mobile terminal of claim 7, wherein the displayed processing status information comprises a message for the image displayed on the display.

9. The mobile terminal of claim 1, wherein the controller is further configured to change a size of the image displayed on the display according to a distance between a visitor's current location corresponding to the image and the doorlock device.

10. The mobile terminal of claim 9, wherein the controller is further configured to increase a size of the image displayed on the display as a distance between a visitor's current location corresponding to the image and the doorlock device decreases.

11. The mobile terminal of claim 1, wherein the controller is further configured to change a vibration intensity of the mobile terminal and a volume level of an audio signal output through an audio output unit of the mobile terminal according to a distance between a visitor's current location corresponding to the image and the doorlock device.

12. A mobile terminal, comprising:
a display:
a wireless communication processor configured to pair the mobile terminal with a doorlock device; and
a controller configured to:
receive an image captured by the doorlock device,
display the received image on the display, and
control the doorlock device based on a touch input applied to the displayed image,
wherein the controller is further configured to:
record visitor images captured by the doorlock device based on a user request or automatically,
register the recorded visitor images and visitor information on the visitor images on a visitor list according to a user input,
automatically register a visitor image that is not registered on the visitor list among the recorded visitor images on the visitor list as a warning image, and
unlock or lock the doorlock device based on the touch input applied to the displayed image.

13. The mobile terminal of claim 12, wherein when a first visitor image matches the displayed image among the visitor images registered on the visitor list, the controller is further configured to display first visitor information mapped to the first visitor image on the displayed image.

14. The mobile terminal of claim 12, wherein when a first visitor image matches the received image among the visitor images registered on the visitor list, the controller is further configured to display an icon for controlling the doorlock device on the displayed image.

15. The mobile terminal of claim 14, wherein the controller is further configured to control the doorlock device based on the selection of the icon or the rotation of the mobile terminal.

16. The mobile terminal of claim 12, wherein when the warning image registered on the visitor list matches the received image, the controller is further configured to lock the doorlock device and output a warning sound through an output unit.

17. A method of controlling a mobile terminal, the method comprising:
pairing, via a wireless communication unit, the mobile terminal with a doorlock device;
receiving, via the wireless communication processor, an image captured by the doorlock device;
displaying, via a display of the mobile terminal, the received image;
controlling, via a controller of the mobile terminal, the doorlock device based on a touch input applied to the displayed image;
automatically muting a video call voice when the image is received from the doorlock device while a video call screen is displayed on the display; and
transmitting a user voice corresponding to a user of the mobile terminal to the doorlock device through the wireless communication unit,
wherein the controlling comprises unlocking or locking the doorlock device based on the touch input applied to the displayed image.

* * * * *